UNITED STATES PATENT OFFICE.

GÁBOR HEGYI, OF LOS ANGELES, CALIFORNIA.

DUST-CLEANER.

No. 850,575.     Specification of Letters Patent.     Patented April 16, 1907.

Application filed August 20, 1906. Serial No. 331,382.

*To all whom it may concern:*

Be it known that I, GÁBOR HEGYI, a citizen of the United States, residing at Los Angeles, county of Los Angeles, State of California, have invented and discovered a new and useful Composition of Matter, an Improvement in Dust-Cleaners; and I do hereby declare the following to be a full, clear, and exact description of the invention, such as will enable others skilled in the art to which it appertains to make and use the same.

This invention or discovery relates to a new and useful composition of matter to be used for cleaning dust upon carpets, rugs, oil-cloths, linoleums, and other coverings for floors of dwellings, buildings, and the like. The improved compound is also used for removing dust from wood floors constructed of various kinds of wood and of other material. My improved composition is, furthermore, applied and used for removing dust from tile floors used for halls of dwelling-houses, office-buildings, and the like.

My improved composition consists of the following ingredients, combined in the proportion stated in every one hundred pounds—namely, sawdust, forty-five pounds; ground apricot stones and kernels, twenty-five pounds; Arizona field-salt, fourteen pounds; refined coal-oil, eight pounds; pine-tree tar, one and one-half pounds; river-sand, five pounds; geolin, one-half pound; carmin, one-half pound; bichlorid of mercury, one-half pound.

Geolin is a by-product obtained in the manufacture of vaseline. Geolin is colorless, odorless, oily-appearing liquid, having an oily feeling when rubbed between the fingers, and is universally sold by wholesale and retail druggists.

This composition of matter I use for scrubbing and cleaning dust from carpets, rugs, linoleums, oil-cloths, and other coverings for floors, and the manner of applying my improved compound after the ingredients hereinabove mentioned have been thoroughly mixed is by sprinkling the said composition here and there upon the said floor-coverings and then sweeping the compound over the surfaces of the said floor-coverings with a broom. Another way of applying my improved compound is by scattering the composition little by little upon the surfaces of carpets and the other hereinabove-mentioned floor-coverings and to rub briskly, by means of a cloth, the composition over the said surfaces of the said coverings, and it will be found that the dust in the coverings will be removed therefrom, absorbed, and taken up by the compound, grease-spots, stains, and the like thereon removed, the surfaces of said coverings enlivened, and the dull faded colors made fresher and brighter.

The manner of applying my improved compound to wood floors of various kinds after the hereinabove-mentioned ingredients have been intimately mixed is by sprinkling portions of my composition over the surfaces of the floors, sweeping with a stiff broom, or rubbing with a cloth in the hand of an operator the said composition over the surfaces of the floors.

The wood floors after the compound has been applied thereto in the manner hereinabove stated will not only have all the dust, animalculæ, and microbes removed therefrom, the latter destroyed and exterminated, but the grain of the woods forming the floors will be brought out, and the floors will present smooth, polished, burnished surfaces.

My improved compound when applied to tile, concrete, and floors of like material will remove dust, grease-spots, and stains therefrom and give to these floors a clean, polished appearance, as well as destroy all insects, microscopic or otherwise, adhering thereto.

The manner of applying my improved compound to tile, concrete, and like floors is similar to that hereinabove mentioned to wood floors—sprinkling or scattering the said composition over the surfaces of these floors of tile, concrete, and like material and then sweeping the said composition back and forth with a broom over the surfaces thereof, or rubbing with a cloth the said composition over the surfaces of these floors.

What I do claim, and desire to secure by Letters Patent of the United States, is—

1. A composition of matter of one hundred pounds consisting of the following ingredients and proportions: sawdust forty-five pounds, ground apricot stones and kernels twenty-five pounds, Arizona field-salt fourteen pounds, refined coal-oil eight pounds, river-sand five pounds, pine-tree tar one and one-half pounds, geolin one-half pound, carmin one-half pound, bichlorid of mercury one-half pound, substantially as described.

2. A composition of one hundred pounds weight, consisting of, sawdust forty-five pounds, ground apricot stones and kernels twenty-five pounds, Arizona field-salt fourteen pounds, refined coal-oil eight pounds, river-sand five pounds, carmin one-half pound, bichlorid of mercury one-half pound, viscous material in quantity sufficient with the above ingredients to make one hundred pounds, substantially as described.

3. A composition of matter of one hundred pounds weight, containing the following ingredients and proportions: sawdust forty-five pounds, ground apricot stones and kernels twenty-five pounds, chlorid of sodium fourteen pounds, oleaginous material eight pounds, silica five pounds, carmin one-half pound, bichlorid of mercury one-half pound, viscous material two pounds, substantially as described.

In testimony whereof I have signed my name to this specification in the presence of two subscribing witnesses.

GÁBOR HEGYI.

Witnesses:
JAMES R. ROGERS,
A. M. HINCHMAN.